US012003776B2

United States Patent
Mangal et al.

(10) Patent No.: US 12,003,776 B2
(45) Date of Patent: Jun. 4, 2024

(54) REDUCING FILE SIZES FOR MEDIA CONTENT

(71) Applicant: Western Digital Technologies, Inc., San Jose, CA (US)

(72) Inventors: Govind Kumar Mangal, Karnataka (IN); Eldhose Peter, Karnataka (IN); Rakesh Balakrishnan, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/564,193

(22) Filed: Dec. 28, 2021

(65) Prior Publication Data
US 2023/0209089 A1    Jun. 29, 2023

(51) Int. Cl.
*H04N 19/70* (2014.01)
*H04L 65/75* (2022.01)
*H04N 19/59* (2014.01)
*H04N 19/85* (2014.01)

(52) U.S. Cl.
CPC ........... *H04N 19/70* (2014.11); *H04L 65/762* (2022.05); *H04N 19/59* (2014.11); *H04N 19/85* (2014.11)

(58) Field of Classification Search
None
See application file for complete search history.

(56) References Cited

U.S. PATENT DOCUMENTS

2006/0132620 A1 *   6/2006   Takada ............... H04N 1/32128
                                                     348/231.3
2006/0242163 A1    10/2006   Miller et al.

OTHER PUBLICATIONS

Luca Tiozzo, Real-time Thumbnail Generation in a (mostly) Serverless AWS Architecture, THRON's Tech Bog, Jun. 16, 2020, 9 pages, https://medium.com/thron-tech/real-time-thumbnail-generation-in-a-mostly-serverless-aws- architecture-667c10e177b0.

* cited by examiner

*Primary Examiner* — Christopher Braniff
(74) *Attorney, Agent, or Firm* — Chang & Hale LLP

(57) ABSTRACT

A storage device is configured to reduce the file size of media files stored on the device by removing thumbnail data. In response to determining that a data file received from a host is a media file having thumbnail data and a file size, the control circuitry is configured to modify the media file to remove the thumbnail data and reduce the file size of the media file, and then store the modified media file. In response to receiving a request for the data file from the host, the storage device responds by retrieving the modified media file from the storage medium, generating second thumbnail data corresponding to the original thumbnail data, remodifying the media file to add the second thumbnail data to the request; and providing the remodified media file to the host.

20 Claims, 5 Drawing Sheets

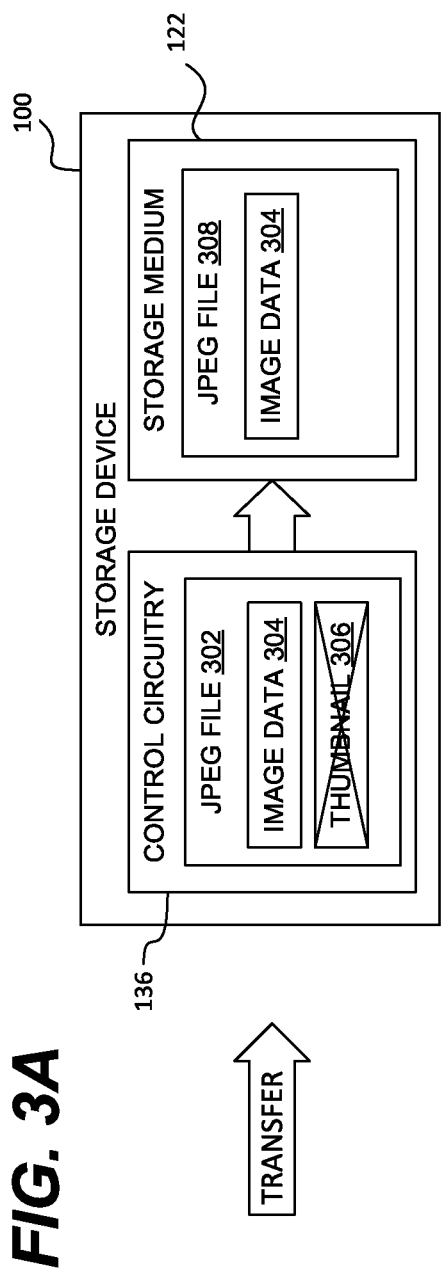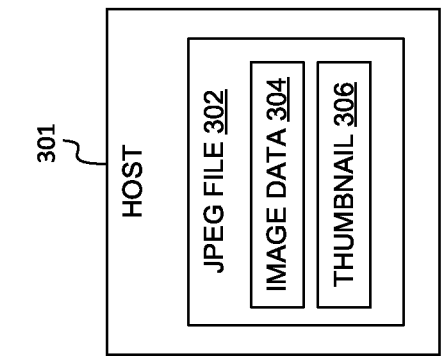

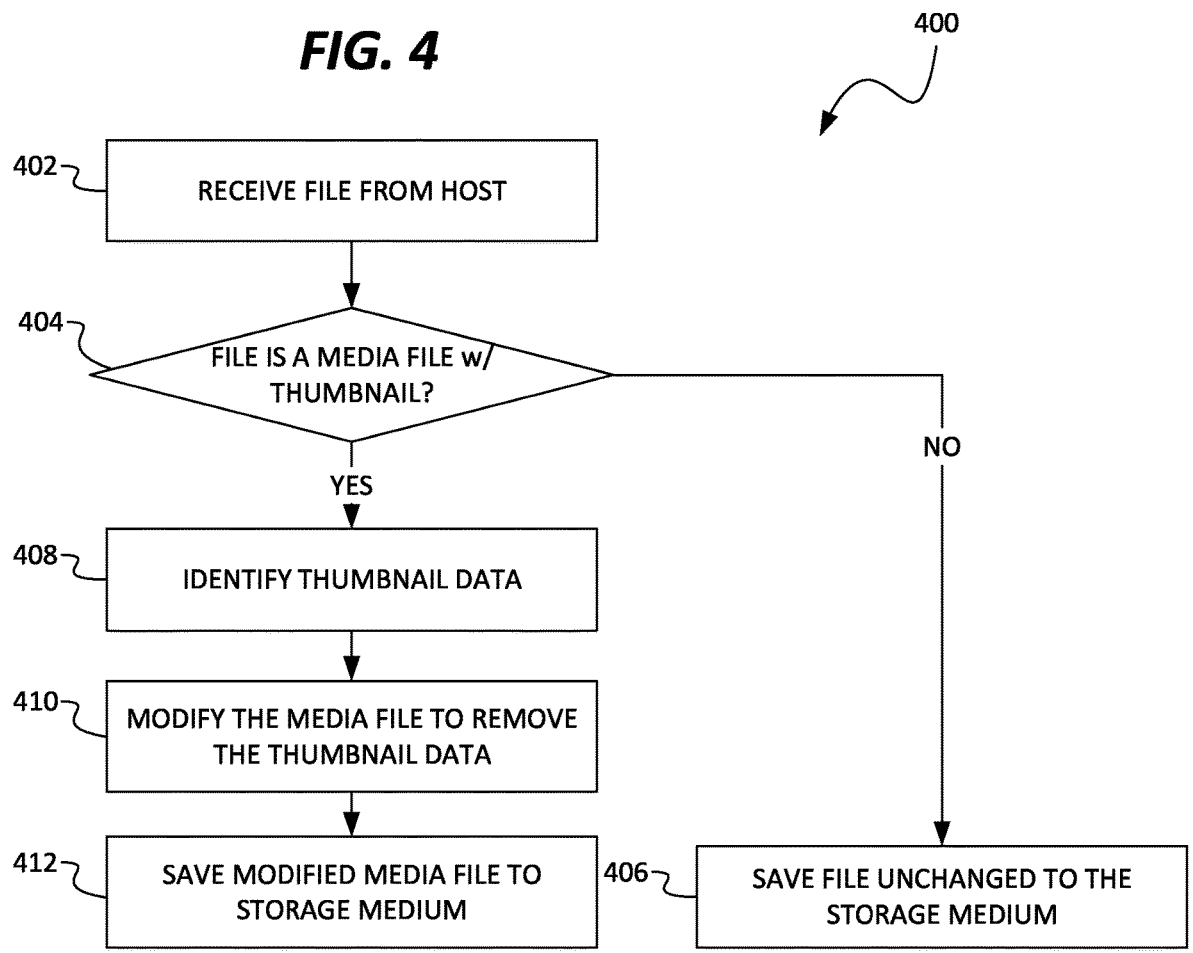

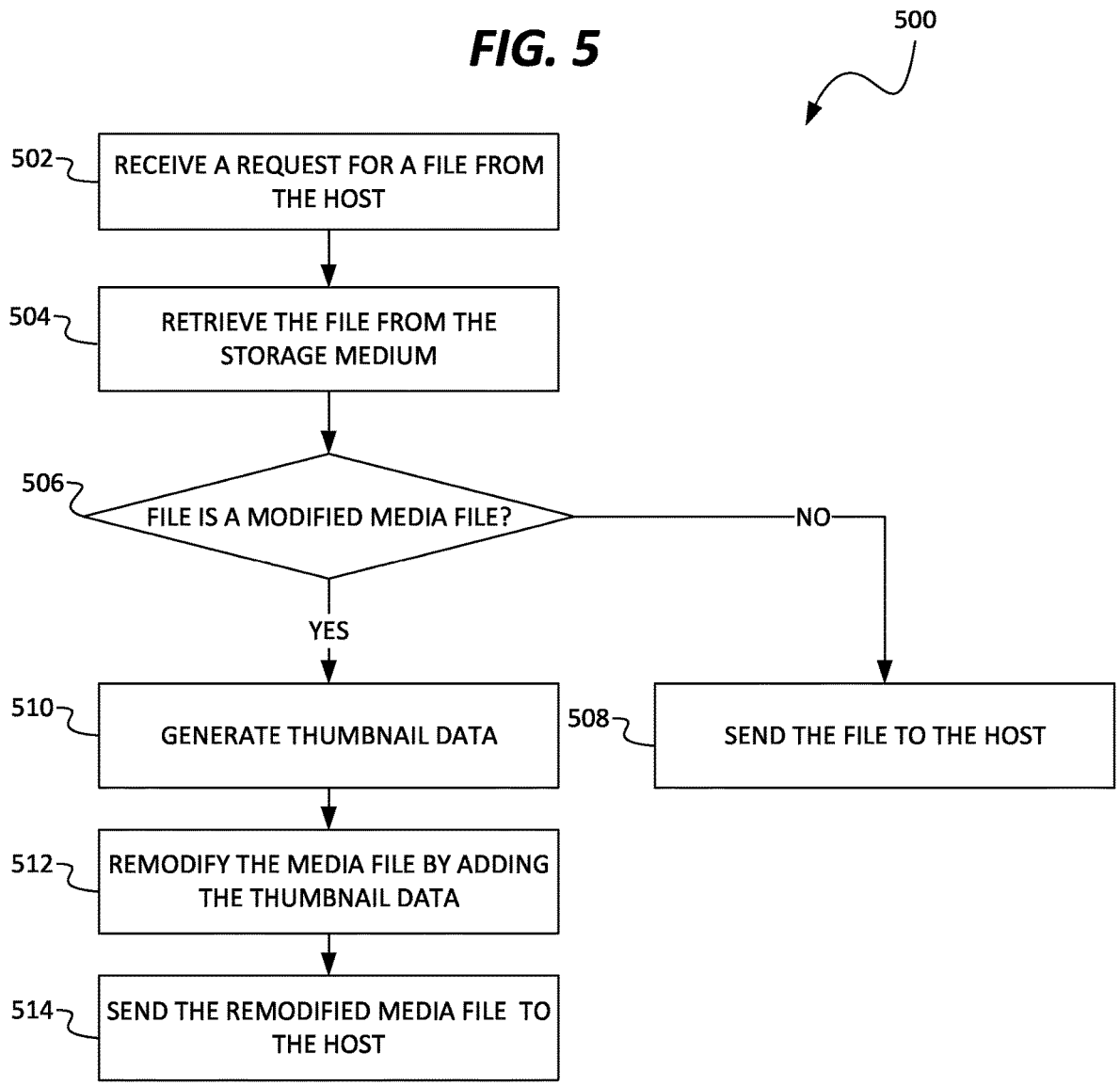

REDUCING FILE SIZES FOR MEDIA CONTENT

BACKGROUND

Field

This disclosure relates to data storage devices. More particularly, the disclosure relates to devices and methods for reducing file sizes.

Description of Related Art

Storage devices store data for a variety of devices and may be directly connected to hosts or connected through a network. Storage devices include internal drives, external drives, and network attached storage (NAS).

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIGS. 3A and 3B show a block diagram of a thumbnail operation of the storage device during a data transfer and a data retrieval, respectively, according to certain embodiments.

FIG. 4 illustrates a process 400 for removing a thumbnail from a media file, according to certain embodiments.

FIG. 5 illustrates a process 500 for adding a thumbnail back to a modified media file, according to certain embodiments.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Disclosed herein are systems, devices, and methods for reducing the file sizes of certain media files stored in storage devices. Certain types of media files, such as image or video files, can sometimes include thumbnail data embedded in the file. While generally a small size relative to the media file, in large numbers, the thumbnail data can take up a large amount of space in the storage device. For example, a storage device may store tens or hundreds of thousands of media files. Assuming thumbnails are 64 kilobytes (KB) in size, 1000 thumbnails can use 64 megabytes (MB). A one terabyte (TB) drive storing 600,000 image files would have about 38.4 gigabytes (GB) of thumbnail data. Thus, removing the thumbnail data can leave room for tens of thousands of additional image files. In large scales, such as scenarios involving data centers, these space savings can have significant cost advantages.

However, simply removing the thumbnail file when saving the media file to the storage device would reduce usability for users. Thumbnails allow the users to easily distinguish between files; removing the thumbnails would make this significantly harder. Thus, embodiments of storage devices described herein not only remove the thumbnail when saving the media file to its storage medium but also recreate the thumbnail when the media file is requested by a host device. The host device does not need to account for the removal and recreation of the thumbnails as the storage can handle those operations transparently for the host device. From the perspective of the host device, it saves a media file with a thumbnail to the storage device and is able to retrieve the same media file with a thumbnail from the storage device.

Data Storage Device

Figure 1:
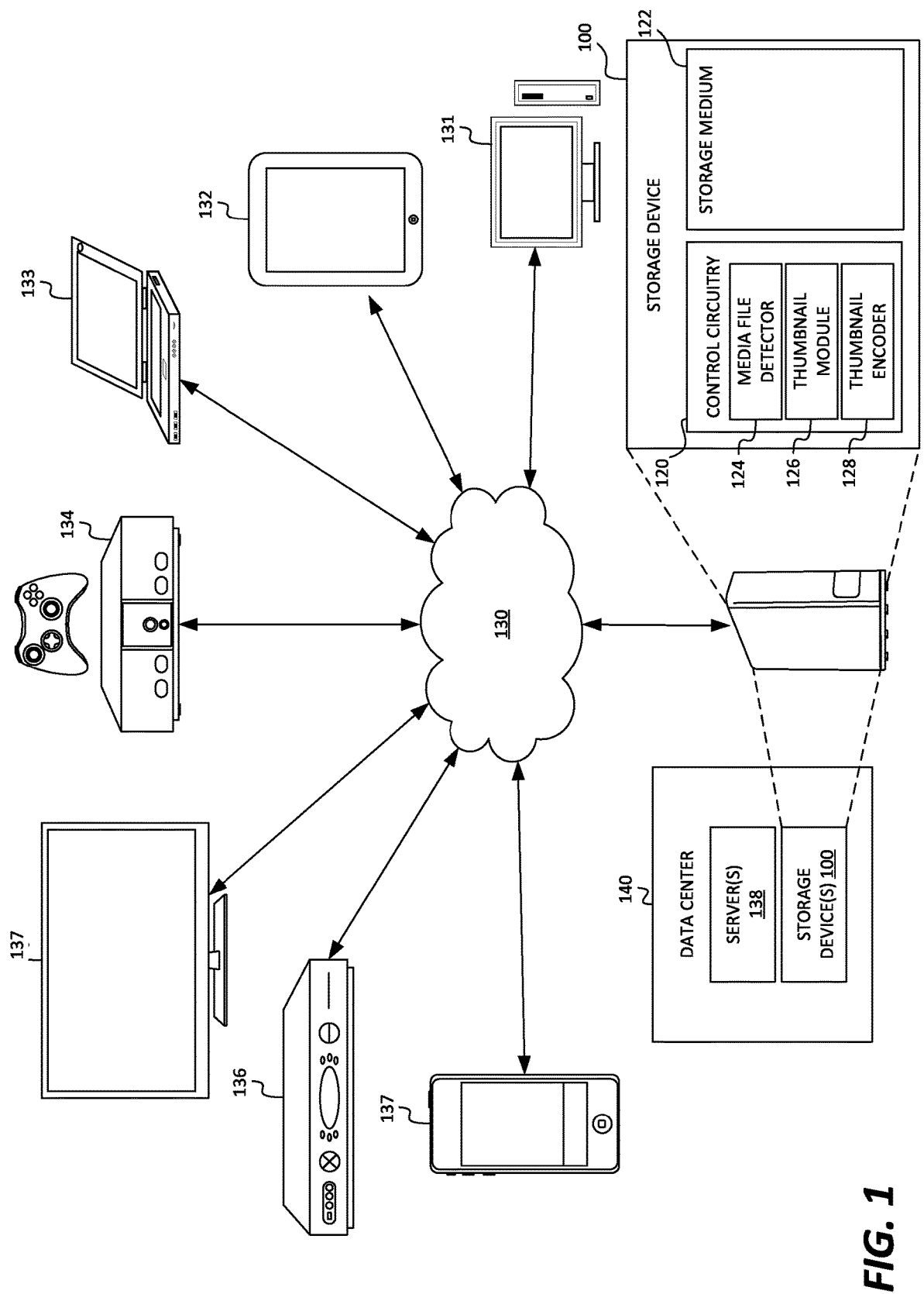
FIG. 1 is a diagram illustrating an embodiment of a data storage device configured to remove and restore thumbnails, according to certain embodiments.

FIG. 1 is a diagram illustrating an embodiment of a data storage device 100 configured to remove and restore thumbnails, according to certain embodiments. In one embodiment, the storage device 100 includes control circuitry 120 for processing data and a storage medium 122 for storing data. The storage device 100 may employ a variety of storage technologies and/or form factors. For example, the storage device 100 can be an internal drive, an external drive, a networked attached storage (NAS), or a storage area network (SAN). The storage device 100 may be a solid state drive (SSD) that uses semiconductor memory, a hard disk drive (HDD) that uses magnetic disks, or a solid state hybrid drive (SSHD) that uses a combination of semiconductor memory and magnetic disk technology.

In some embodiments, the control circuitry 120 is configured to manage semiconductor memory. The control circuitry 120 may include or be an SSD controller configured to execute firmware for controlling the storage device. The control circuitry 120 can include an embedded processor, electrically erasable firmware read-only-memory (ROM), system random access memory (RAM), error correction code (ECC) circuitry, head controller, voice coil motor (VCM) controller, and/or a host electrical interface such as serial ATA (SATA), universal serial bus (USB), or Serial-Attached SCSI (SAS).

In some embodiments, the control circuitry 120 is configured to manage magnetic technology. The control circuitry 120 may include or be an HDD controller configured to execute firmware for controlling the storage device. The control circuitry 120 can include an embedded processor, electrically erasable firmware read-only-memory (ROM), system random access memory (RAM), error correction code (ECC) circuitry, and/or a host electrical interface such as serial ATA (SATA), universal serial bus (USB), NVM Express (NVMe), or Serial-Attached SCSI (SAS).

The control circuitry 120 can also include additional functionality. For example, the control circuitry 120 may support file based storage in order to identify different types of files. The control circuitry 120 can also include functionally for processing thumbnails. The control circuitry can include a media file detector 124, a thumbnail module 126, and a thumbnail encoder 128. The media file detector 124 can identify media files that include a thumbnail, the thumbnail module 126 can delete the thumbnail from the file to reduce the file size, the thumbnail encoder 128 can recreate the thumbnail from the image or video data in the data file, and the thumbnail module 126 can add the recreated thumbnail back to the data file.

In some embodiments, the media file detector 124 is implemented as a list, datastore, or database of file formats that contain thumbnails. When a matching file format is found, the media file is processed with the thumbnail module 126. In some implementations, the media file detector 124 may also check the media file for a stored thumbnail before sending it to the thumbnail module 126. As some media files that support thumbnails may nevertheless not include thumbnail data, those files can be saved without modification by the storage device 100.

The thumbnail module 126 can then remove the thumbnail data from the media file and shrink the file size. For example, the thumbnail may be attached to the end of the media file. In those situations, thumbnail module 126 can move the end of file marker to the just before the thumbnail data. The control circuitry 120 may also edit the header data or other parts of the media file to change the length of the file. In situations where the thumbnail is embedded somewhere in the middle of the file, thumbnail module 126 can concatenate the file to shorten it by joining the section prior to the thumbnail with section of the file after the thumbnail, leaving out the thumbnail data. Other methods may also be used to shorten the file and delete the thumbnail data. The control circuitry 120 may also edit the header data of the file if necessary to account for the changes to the file from removing the thumbnail data.

The storage medium 122 can utilize various types of non-volatile memory (NVM) to permanently store data. NVM is a type of computer memory that can retain stored information even after power is removed. For example, the storage medium 122 can include one or more magnetic disks and/or semiconductor memory. The semiconductor memory can include any of various memory technologies, such as NAND memory and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as ReRam, Phase-Change Memory (PCM), and Magnetoresistive RAM (MRAM).

Some data storage devices are designed to be put into a system. For example, SSDs in the M.2 or 2.5" form factor and HDDs or SSHD in a 2.5" or 3.5" form factor are designed to be put into servers, computers, laptops or the like. Some data storage devices are configured to run externally from a host system. For example, direct attached storage (DAS) devices are configured to be removably connected (e.g., through USB) to host systems and be easily disconnected. Many such devices typically lack a display and an independent power source, such as a battery or a power supply. Instead, such devices communicate and obtain power through the host. For example, such devices can send messages for display on a user interface of the host that is shown on a host's display screen. Such devices may also connect through an interface capable of providing power, as well as transfer of data, such as USB.

The storage device 100 may be communicatively coupled to one or more host devices. The storage device 100 may provide file-based, block-based, and/or object-based data storage services to connected devices. Typically, the storage device 100 is connected to one host device at a time, though some embodiments may enable concurrent connections to multiple hosts. For example, some embodiments may have multiple connection ports or use a network interface. In one example scenario, the storage device 100 is physically connected to a port (e.g., USB or power over ethernet (PoE)) on the host device that enables data transfer and provides power to the storage device 100. In some embodiments, the storage device 100 does not have a display or a separate power source, so relies on the host device for power and input/output.

Various types of host devices can access the storage device 100. Such host devices can include phones 137, such as smartphones, cable set-top boxes 136, smart TV's 135, video game consoles 134, laptop computers 133, tablet computers 132, desktop computers 131, wearable computers (not shown) and/or other network-connected computing devices. In some scenarios, the storage device 100 is installed in a data center 140 as part of an array of storage devices. One or more servers 138 in the data center 140 can serve as hosts to the storage devices. For example, the host device may be a server in a server chassis, with a central processing unit (CPU) connected, via a system bus, to one or more internal storage devices (e.g., M.2, 2.5", or 3.5" form factor) contained within the server chassis.

The host device can connect to the storage device 100 via a communication system 130 or other data interface. Depending on the type of storage device 100, different types of communication systems may be used. For example, for internal storage devices, the communication system 130 typically comprises a bus, such as peripheral component interconnect express (PCIE) or SATA. For an external drive, the communication system 130 typically comprises a cable and communication interface such as USB. For a NAS device, the communication system 130 typically comprises a network, which can include a local area network (LAN) and/or a wide area network (WAN).

The host device can include a data/power interface for communicating with the storage device 100 and providing it with power. The data and power interface 154 may be combined into a single physical port, such as some form of USB port (e.g., USB-A, USB-B, USB-C, mini-USB, micro-USB, etc.), Thunderbolt port, NVMe, PoE, or the like. Some host devices may have separate ports for data (e.g., eSATA, SATA, ethernet, etc.) and power. In some embodiments, a corresponding data and power interface is found on the storage device 100.

Thumbnail Operations on Media Files

Figure 2:
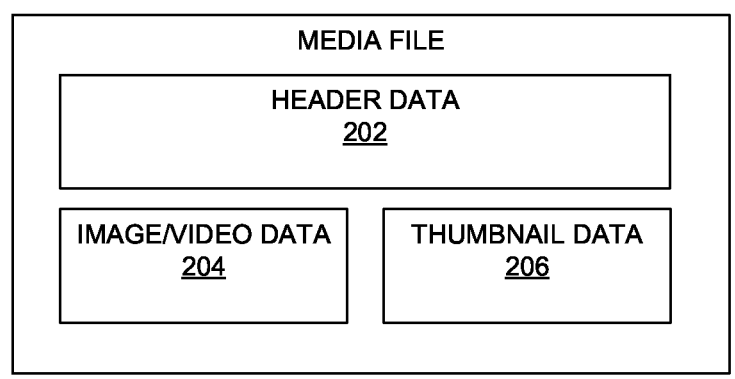
FIG. 2 illustrates a block diagram representing a media file, according to certain embodiments.

FIG. 2 illustrates a block diagram representing a media file 200, according to certain embodiments. At a high level, the media file can include header data 202, image and/or video data 204, and thumbnail data 206. Depending on the specific format of the media file, different types of information may be stored in the header. For example, Joint Photographic Experts Group (JPEG) format files use a sequence of markers to define segments, where different types of information can be stored in different segments. Some segments can include information such as file length, an identifier, version information, resolution data, and pixel count. Other file formats can include different data in the header data 202.

At least some types of media files 200 are capable of storing thumbnail data 206. Thumbnails are reduced-size versions of pictures or videos that may be embedded into their corresponding media files. They can be used to facilitate viewing and organizing media files, and can be used by operating systems and search engines in displays of the media files they represent. Many formats have a size limit, such as 64 kilobytes (KB) for embedded thumbnails.

Media files that use thumbnails can use the thumbnails to represent the image and/or video data 204. For example, JPEG image files can include a smaller thumbnail that represents the media file that can be used as icons by operating systems. In another example, video files can include a thumbnail of a frame in the video file, where the thumbnails can be used as icons by operating systems.

FIGS. 3A and 3B show a block diagram of a thumbnail operation of the storage device 100 during a data transfer and a data retrieval, respectively, according to certain embodiments. For ease of explanation, the following describes operations involving a JPEG image file. However, the thumbnail operation can be used with different types of media files, including both video and image files.

In FIG. 3A, the host device 301 is transferring a JPEG file 302 that contains image data 304 and thumbnail data 306 to the storage device 100. As discussed in FIG. 1, the host device may be any of several types of devices and connected to the storage device in several possible ways.

The storage device 100 receives the JPEG file 302 and processes it using its control circuitry 120. The control circuitry 120 removes the thumbnail data 306 from the JPEG file. Typically, thumbnail data 306 is stored in a particular area in the file, with the location define by the standards for that file format. By determining the file format, the control circuitry 120 can then identify the location of the thumbnail. The control circuitry 120 can then remove the thumbnail data and shrink the file size (e.g., by moving the end of file marker or concatenating the file around the removed thumbnail data 306). The control circuitry 120 may also edit the header data of the JPEG file if necessary to account for the changes to the file from removing the thumbnail data 306. Deleting the thumbnail data creates a second version (JPEG file 308) of the image file. The control circuitry 120 then sends the modified JPEG file 308 to the storage medium 122 for storage. As discussed in FIG. 1, various types of storage technologies can be used for the storage medium 122, including semiconductor and/or magnetic recording technologies.

In FIG. 3B, the storage device 100 is transferring the modified JPEG file 308 to the host, in response to a request for the original file from the host. As the original file is no longer the same, having been modified into JPEG file 308 that lacks the original thumbnail data 306, the control circuitry 120 processes the modified JPEG file 308 to add the second thumbnail data 312. The second thumbnail data 312 is not necessarily bitwise identical to the original thumbnail data 306. While both thumbnails may depict the same image, the thumbnails may have been generated using different encoders and/or parameters. Thus, while the depicted image is the same, the bits in the thumbnail data may vary. However, in some situations, if the original thumbnail and the second thumbnail are generated in the exact same way, the thumbnails can be identical.

Remodifying the JPEG file to add back the thumbnail creates a third version of the JPEG file 310. The third version of the JPEG file 310 contains the same image data 304 as the original file but may have a bitwise different, but similar thumbnail 312 to the original thumbnail 306. A user viewing the second thumbnail 312 would be unlikely to see any difference from the original thumbnail 306. However, performing a bitwise comparison of the two thumbnails may show that not all the bits are identical. However, in some situations, the JPEG file 310 may end up bitwise identical to the original JPEG file 302 if the generated second thumbnail 312 is identical to the original thumbnail 306.

The storage device 100 can then send the JPEG file 310 to the host 301 in response to the original request. In some embodiments, the host 301 is unaware that the JPEG file 310 has changed from the original version. For example, the storage device 100 may perform these thumbnail operations without the knowledge of the host. In other embodiments, the host 301 may be aware of these operations and may coordinate these operations with the storage device 100. For example, the host 301 or a user may enable these thumbnail operations by changing a configuration setting on the storage device 100. The host 301 may also coordinate with the storage device 100 by providing the location of the thumbnail data and/or file type information. This can be useful where the storage device provides block-based storage and may not have access to file type information.

FIG. 4 illustrates a process 400 for removing a thumbnail from a media file, according to certain embodiments. At least some of the steps of the process 400 may be implemented at least in part by a storage device 100 or its components, such as its control circuitry 120. For ease of explanation, the following refers to components described in earlier figures. However, the process 400 is not limited to being performed just by those components and other embodiments may use different components to run the process.

At block 402, the storage device 100 receives a data file from a host device 301. For example, the host device 301 may be performing a write operation and is writing the data file to the storage device 100. Depending on the configuration, the data file may be sent over a variety of communication systems, such as a system bus, network, USB cable, or the like.

At block 404, the storage device 100 determines whether the file is a media file with a thumbnail. If the data file is a media file with a thumbnail, the process proceeds to block 408. If the data file is not a media file or is a media file without a thumbnail, the process proceeds to block 406.

At block 406, the storage device 100 has determined that the data file is not a media file with a thumbnail and proceeds to save the file unchanged to the storage medium 122. The process can then end. When the host requests the data file in the future, the storage device 100 can simply read the data file from the storage medium 122 and provide it to the host 301.

Going back to block 408, the storage device 100 has determined that the data file is a media file with a thumbnail that can be removed. The storage device 100 then finds the thumbnail data in the media file. As discussed above, there are several methodologies that can be used to find the thumbnail data. For example, the storage device 100 may have a mapping of file types and thumbnail locations in those types. In another example, the storage device 100 may look for particular markers used by specific file types to denote the thumbnail. In another example, the storage device 100 may read the header data to find an entry showing the location of the thumbnail in the file.

In block 410, the storage device 100 modifies the media file to remove the thumbnail data. For example, the storage device 100 may shorten the file to leave out a thumbnail located at the end of file. In another example, the storage device 100 may concatenate the front segment of the data file in front of the thumbnail with the back segment of the data file after the thumbnail to create a smaller file that leaves out the thumbnail data. Other methods may also be used to remove the thumbnail data and reduce the file size.

At block 412, the storage device 100 saves the modified media file to the storage medium. The storage device 100 may also mark the media file to indicate that the file has been modified. The mark allows the storage device 100 to quickly determine that a file has had a thumbnail removed. This information can be useful during a restoration process, when a thumbnail is added back to the media file. The process can then end.

Assuming the process 400 is run over thousands or tens of thousands of image files, the storage device 100 can save a significant amount of space on the storage medium by removing the thumbnails. In certain settings such as data center environments which can have thousands of storage devices, these space savings can add significant cost savings for operators.

FIG. 5 illustrates a process 500 for adding a thumbnail back to a modified media file, according to certain embodiments. At least some of the steps of the process 500 may be implemented at least in part by a storage device 100 or its components, such as its control circuitry 120. For ease of explanation, the following refers to components described in earlier figures. However, the process 500 is not limited to being performed just by those components and other embodiments may use different components to run the process.

At block 502, the storage device 100 receives a request for a data file from a host device 301. For example, the host device 301 may be performing a read operation and is reading the data file from the storage device 100.

At block 504, the storage device 100 retrieves the request file from the storage medium 122. As discussed earlier, the storage medium may use a variety of storage techniques, such as semiconductor memory or magnetic recording. Depending on the technology, the appropriate retrieval process is used to read back the data corresponding to the file form the storage medium.

At block 506, the storage device 100 determines whether the file is a modified media file with a deleted thumbnail (e.g., as created in the process 400 of FIG. 4). If the data file is a modified media file with a deleted thumbnail, the process proceeds to block 508. If the data file is not a modified media file or not a media file at all, the process proceeds to block 510.

In some embodiments, the storage device 100 looks for a modified marker in the file to determine that the file has been modified. By marking modified files, the storage device 100 can quickly determine which files have been modified.

Alternatively, in some embodiments, the storage device 100 can maintain a list or database of modified files. When retrieving a file, the storage device 100 can refer to the list or database to determine whether the file has been modified.

In another alternative, the storage device 100 may designate a particular block address range or otherwise specify an area on the storage medium for modified files. The storage device 100 can then save modified files to that area. When retrieving a file, the storage device 100 can check whether the file was stored in that specified area. If the file comes from the area, the storage device 100 can determine that the file has been modified.

At block 508, the storage device 100 has determined that the requested data file is not a modified media file and sends the file to the host 301. As the original data file was never modified, the storage device does not need to perform any special operations on the data file before sending it to the host. The host 301 can then utilize the file as needed. The process then ends.

Going back to block 510, the storage device 100 has determined that the requested data file is a modified media file with a deleted thumbnail. The storage device 100 then generates a second thumbnail data that corresponds to the original thumbnail data that was deleted. In one embodiment, the storage device 100 uses an encoder that analyses the image or video data in the file and then generates a thumbnail. The second thumbnail may not be bitwise identical to the original thumbnail. For example, the encoder used by the storage device 100 may be different from the encoder used to generate the original thumbnail. The parameters used to generate the second thumbnail may also be different. Thus, the thumbnails may not be identical, even though the image depicted in the thumbnails may appear identical to each other. In some situations where the encoder and parameters do match, the second thumbnail data may end up being identical to the original thumbnail data.

At block 512, the storage device 100 remodifies the media file by adding in the generated thumbnail data. In some embodiments, adding the thumbnail data may involve appending the thumbnail to the end of the media file. In some embodiments, adding the thumbnail data may mean splitting the media file into two segments, inserting the thumbnail data between the two segments, and connecting all the segments together again.

At block 514, the storage device 100 sends the modified media file to the host 301. In some embodiments, the host may be unaware that the file has been modified. In other embodiments, the host may be aware that the storage device 100 is removing and recreating the thumbnail data. The process then ends.

Additional Embodiments

Those skilled in the art will appreciate that in some embodiments, other types of storage devices can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:
1. A storage device comprising:
a data interface configured to communicate with a host;
a storage medium configured to store data; and
control circuitry configured to:
receive a data file from the host over the data interface;

in response to determining that the data file comprises first file preview data and a file size:
modify the data file to delete the first file preview data to reduce the file size of the data file; and
store the modified data file to the storage medium; and
in response to receiving a request for the data file from the host:
retrieve the modified data file from the storage medium;
generate second file preview data corresponding to the first file preview data;
remodify the modified data file to add the second file preview data; and
respond to the request for the data file by providing the remodified data file to the host.

2. The storage device of claim 1, wherein the storage medium comprises non-volatile memory and the storage device is a solid state drive.

3. The storage device of claim 1, wherein the storage medium comprises a magnetic disk and the storage device is a hard disk drive.

4. The storage device of claim 1, wherein the data interface comprises a network interface and the storage device is a network attached storage (NAS).

5. The storage device of claim 1, wherein the storage device is configured to be installed in a data center and the host is a server in the data center.

6. The storage device of claim 1, wherein the first file preview data and the second file preview data are similar but not identical.

7. The storage device of claim 1, wherein the first file preview data and the second file preview data are identical.

8. The storage device of claim 1, the control circuitry further configured to:
in response to determining that a second data file is not a media file, store the second data file without changes to the storage medium.

9. The storage device of claim 1, wherein the data file is a Joint Photographic Experts Group (JPEG) file.

10. The storage device of claim 1, wherein the data file is a video file.

11. The storage device of claim 1, wherein the first file preview data is thumbnail data and the data file is a media file.

12. A method of reducing a file size of a data file, the method comprising:
receiving, at a storage device, a data file from a host in communication with the storage device;
in response to determining that the data file comprises first file preview data and a file size:
modifying the data file to delete the first file preview data to reduce the file size of the data file; and
storing the modified data file to a storage medium of the storage device; and
in response to receiving a request for the data file from the host:
retrieving the modified data file from the storage medium;
generating second file preview data corresponding to the first file preview data;
remodifying the modified data file to add the second file preview data; and
responding to the request for the data file by providing the remodified data file to the host.

13. The method of claim 12, wherein the storage medium comprises non-volatile memory and the storage device is a solid state drive.

14. The method of claim 12, wherein the storage medium comprises a magnetic disk and the storage device is a hard disk drive.

15. The method of claim 12, wherein the storage device is a network attached storage (NAS).

16. The method of claim 12, wherein the storage device is configured to be installed in a data center and the host is a server in the data center.

17. The method of claim 12, wherein the first file preview data and the second file preview data are similar but not identical.

18. The method of claim 12, wherein the first file preview data and the second file preview data are identical.

19. The method of claim 12, further comprising:
in response to determining that a second data file is not a media file, storing the second data file without changes to the storage medium.

20. A storage device comprising:
means for communicating with a host;
means for permanently storing data; and
control circuitry configured to:
receive a data file from the host over the means for communicating;
in response to determining that the data file comprises first file preview data and a file size:
modify the data file to delete the first file preview data to reduce the file size of the data file; and
store the modified data file to the means for permanently storing data; and
in response to receiving a request for the data file from the host:
retrieve the modified data file from the means for permanently storing data;
generate second file preview data corresponding to the first file preview data;
remodify the modified data file to add the second file preview data; and
respond to the request for the data file by providing the remodified data file to the host.

* * * * *